(12) United States Patent
Fujimoto et al.

(10) Patent No.: US 8,720,292 B2
(45) Date of Patent: May 13, 2014

(54) TRANSMISSION SYSTEM FOR VEHICLE

(75) Inventors: Yasushi Fujimoto, Saitama (JP); Kinya Mizuno, Saitama (JP); Toshimasa Mitsubori, Saitama (JP); Yoshiaki Tsukada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 13/053,485

(22) Filed: Mar. 22, 2011

(65) Prior Publication Data

US 2011/0239805 A1    Oct. 6, 2011

(30) Foreign Application Priority Data

Mar. 30, 2010   (JP) .................................. 2010-078605

(51) Int. Cl.
*F16H 61/32*   (2006.01)
(52) U.S. Cl.
USPC ........................ 74/337.5; 74/473.12
(58) Field of Classification Search
USPC .................... 74/335, 337.5, 473.12
See application file for complete search history.

(56) References Cited

U.S. PATENT DOCUMENTS

| | | | | |
|---|---|---|---|---|
| 4,754,662 | A * | 7/1988 | Misawa ...................... | 74/473.22 |
| 6,085,607 | A * | 7/2000 | Narita et al. .................... | 74/335 |
| 6,443,275 | B1 * | 9/2002 | Hori et al. .................... | 192/3.33 |
| 6,453,762 | B1 * | 9/2002 | Nishikawa et al. ............. | 74/335 |
| 7,469,611 | B2 * | 12/2008 | Tawarada et al. ............... | 74/335 |
| 7,926,373 | B2 * | 4/2011 | Sotani et al. .................... | 74/325 |
| 8,408,086 | B2 * | 4/2013 | Takeuchi ........................ | 74/335 |
| 2007/0026994 | A1 * | 2/2007 | Matsuda et al. ............... | 477/92 |
| 2007/0074593 | A1 * | 4/2007 | Mizuno et al. .................. | 74/330 |
| 2008/0220936 | A1 * | 9/2008 | Kobayashi et al. ............. | 477/70 |
| 2009/0025498 | A1 * | 1/2009 | Sotani et al. .................... | 74/404 |
| 2009/0031834 | A1 * | 2/2009 | Takeuchi ........................ | 74/335 |
| 2009/0084208 | A1 * | 4/2009 | Hayakawa et al. ............. | 74/325 |
| 2009/0084224 | A1 * | 4/2009 | Ogasawara et al. ......... | 74/606 R |
| 2009/0165545 | A1 * | 7/2009 | Fujimoto et al. ........... | 73/115.02 |
| 2009/0222182 | A1 * | 9/2009 | Tomoda et al. ................. | 701/67 |

FOREIGN PATENT DOCUMENTS

| | | |
|---|---|---|
| DE | 19838146 A1 | 3/1999 |
| EP | 1 857 716 A2 | 11/2007 |
| EP | 2 098 760 A2 | 9/2009 |
| JP | 11-222043 A | 8/1999 |
| JP | 2008-232337 A | 10/2008 |
| JP | 2009-085348 | 4/2009 |

* cited by examiner

*Primary Examiner* — Troy Chambers
*Assistant Examiner* — Valentin Craciun
(74) *Attorney, Agent, or Firm* — Squire Sanders (US) LLP

(57) ABSTRACT

In a transmission system for vehicles in which shift position changing drive means is coaxially connected to a shift drum selectively establishing a plurality of gear trains for respective gear steps capable of selective establishment in response to a turned position and a shift position sensor detects which one of the gear trains is being established, the number of component parts is reduced and assembly performance is enhanced while allowing for automatic gear shifting by use of a shift actuator.

16 Claims, 4 Drawing Sheets

TRANSMISSION SYSTEM FOR VEHICLE

BACKGROUND

1. Field

The present invention relates to a transmission system for vehicles including a plurality of gear trains for respective speed steps housed in a crankcase so as to be selectively establishable.

2. Description of the Related Art

Such a transmission system for vehicles is known, for example, in Japanese Patent Laid-Open No. 2009-85348 (Patent Document 1). This transmission system is configured as discussed below. A shift cover is mounted to a crankcase to cover shift position changing drive means. A gear cover is mounted to the shift cover to define a speed reduction chamber between the gear cover and the shift cover. A speed reduction mechanism installed between the shift position sensor mounted to the gear cover and the shift drum is housed in the speed reduction chamber. A shift spindle turnably supported by the crankcase and the shift cover is connected to the shift position changing drive means. A shift pedal is installed at an end of the shift spindle, projecting from the shift cover.

In order to improve operability, requests have been made in recent years to provide an automatic transmission having a shift actuator in place of the shift pedal. In response to such requests, the shift actuator is simply applied to the configuration disclosed in Patent Document 1 to provide a configuration in which the shift actuator is mounted to the shift cover. However, the shift position sensor is mounted to the gear cover attached to the shift cover. Therefore, the shift actuator and the position sensor are mounted to the respective separate members. Thus, there arise problems of the increased number of component parts and cumbersome assembly.

SUMMARY

The present invention has been made in view of such situations and aims to provide a transmission system for vehicles that reduces the number of component parts and enhanceS assembly performance while allowing for automatic gear shifting by use of a shift actuator.

To achieve the above object, the present invention can be embodied, for example, in a transmission system for vehicles, including a plurality of gear trains for respective speed steps housed in a crankcase so as to be capable of selective establishment, and a shift drum turnably supported by the crankcase so as to selectively establish the gear trains in response to a turned position. A shift position changing drive means can be coaxially connected to the shift drum so as to be operated by receiving a drive force and drivingly turning the shift drum in response to the operation. A shift position sensor can detect which one of the gear trains is being established, and a shift actuator exerting power driving the shift position changing drive means and the shift position sensor are mounted to a cover member mounted to the crankcase to cover the crankcase.

The present invention can, in another embodiment, include a speed reduction mechanism reducing the power outputted from the shift actuator is housed in a speed reduction chamber defined between the cover member and the crankcase.

In another embodiment the invention can also be configured such that the shift actuator includes an electric motor and the shift actuator and the shift position sensor are mounted to an external surface, facing the same side, of the cover member.

The present invention can also be embodied such that a shift spindle is connected at one end portion to the speed reduction mechanism and is turnably supported by the crankcase, and is interlocked with and connected to the shift position changing drive means at the other end.

In addition to any of the configurations discussed above, the gear trains can be installed between a main shaft and a counter shaft which are rotatably supported by the crankcase so as to have respective axes parallel to a crankshaft rotatably supported by the crankcase. The shift position sensor disposed between the crankshaft and the countershaft as viewed from the side and the shift actuator can be arranged along the outer circumference of a drive gear installed on the crankshaft.

In addition to the configurations discussed previously, the shift position sensor can be disposed below a plane passing through respective central axes of the crankshaft and the counter shaft and the shift actuator is disposed below the shift position sensor and mounted to the cover member so as to project more externally outwardly than the shift position sensor.

In addition to the aspects of the other embodiments, a shift spindle angle sensor can be provided, and configured to detect a turning angle of the shift spindle, and is connected to the other end of the shift spindle.

In another embodiment, the speed reduction mechanism is composed of a plurality of gears and a meshing portion of the gears is disposed between a pair of upper and lower imaginary horizontal lines passing through an upper end and a lower end, respectively, of the shift actuator as viewed from the side.

Furthermore, the crankcase can be composed of a pair of case half bodies capable of being split vertically and a straight line passing through the respective rotational centers of the gears, excluding the final driven gear, of the plurality of gears constituting the speed reduction mechanism, and through the central axis of the shift actuator as an electric motor is set roughly parallel to the split surface between both the upper and lower case half bodies.

According to one characteristic of an embodiment, both the shift actuator and the shift position sensor are mounted to the cover member covering the crankcase. Therefore, while allowing for automatic gear shifting by use of the shift actuator, the number of component parts can be reduced and assembly performance can be enhanced compared with the case where the shift actuator and the shift position sensor are mounted to respective separate members.

According to another characteristic of another embodiment, the speed reduction chamber is defined between the cover member and the crankcase and the speed reduction mechanism reducing the power outputted from the shift actuator is housed in the speed reduction chamber. Therefore, the shift actuator and the shift position sensor can be mounted by use of the cover member protecting the speed reduction mechanism, which can contribute to a reduction in the number of component parts.

According to another embodiment, the shift actuator which is an electric motor and the shift position sensor are mounted to the external surface, facing the same side, of the cover member. Therefore, the maintenance for the shift actuator and the shift position sensor which are electric component parts can be enhanced.

According to another embodiment, the shift spindle turnably supported by the crankcase is connected at one end portion to the speed reduction mechanism and is interlocked with and connected to the shift position changing means at the other end. Therefore, the speed reduction mechanism and the shift position changing drive means can be arranged to avoid the mutual interference and provided on the crankcase in a compact manner.

According to another embodiment, the shift position sensor is disposed between the crankshaft and the counter shaft as viewed from the side. In addition, the shift position sensor and the shift actuator are arranged along the outer circumference of the drive gear installed on the crankshaft. Therefore, the vertical width of the space required by the cover member to arrange the shift position sensor and the shift actuator can be reduced compared with the case where the shift position sensor and the shift actuator are disposed to align with each other in the vertical direction. This can contribute to the downsizing of the engine.

According to another embodiment, in relation to the shift position sensor disposed below a plane passing through respective central axes of the crankshaft and the counter shaft, the shift actuator is disposed below the shift position sensor and mounted to the cover member so as to project more externally outwardly than the shift position sensor. Therefore, the foot rest space of the vehicle can be enlarged.

According to another embodiment, the shift spindle angle sensor can be connected to the other end of the shift spindle. In addition, the shift spindle can be connected at one end to the speed reduction mechanism housed between the crankcase and the cover member to which the shift position sensor is mounted. Therefore, the shift position sensor and the shift spindle angle sensor can be arranged on the respective sides opposite to each other in the axial direction of the shift spindle so as to avoid the interference therebetween and the shift spindle and the shift drum can be arranged close to each other.

According to another embodiment, the meshing portion of the plurality of gears constituting the speed reduction mechanism is disposed between the pair of upper and lower imaginary horizontal lines passing through the upper end and lower end, respectively, of the shift actuator as viewed from the side. Therefore, the speed reduction mechanism can be configured in a vertically compact manner.

According to another embodiment, the straight line passing through the respective rotational centers of the gears, excluding the final driven gear, of the plurality of gears constituting the speed reduction mechanism, and through the central axis of the shift actuator as an electric motor, is set roughly parallel to the split surface of the crankcase capable of being vertically split. Therefore, the shift actuator and the speed reduction mechanism can be configured compactly so as not to vertically enlarge the shift actuator and the speed reduction mechanism.

DETAILED DESCRIPTION

Figure 1:
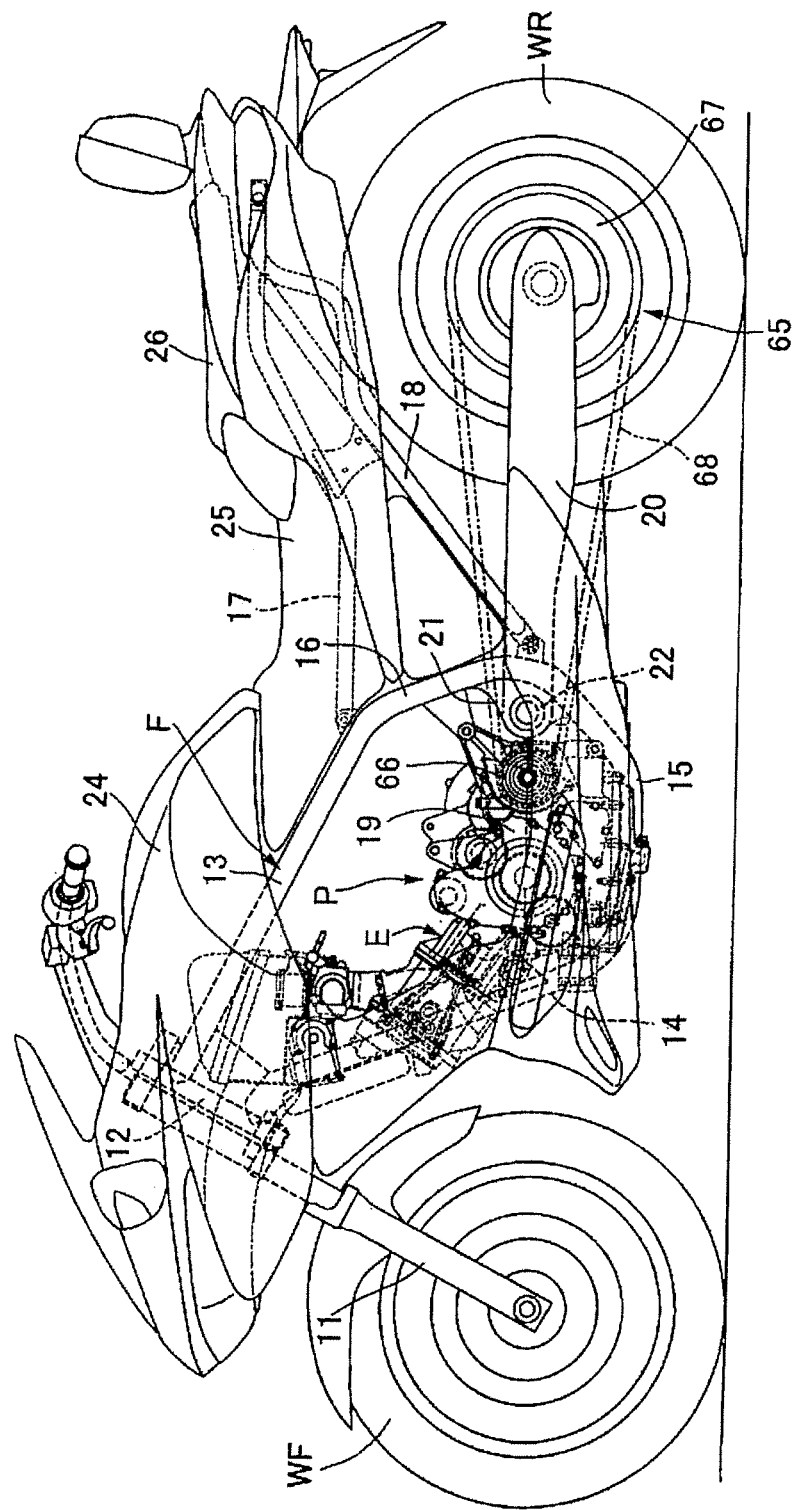
FIG. 1 is a lateral view of a motorcycle.

An embodiment of the present invention will be described with reference to FIGS. 1 to 4. In FIG. 1, a body frame F of a motorcycle as a vehicle includes a head pipe 12 steerably supporting a front fork 11 rotatably supporting a front wheel WF. A pair of left and right main frames 13 extending rearward downwardly from the head pipe 12. A pair of left and right down frames 14 extending rearward downwardly at a steeper angle than the main frames 13. Lower frames 15 extend rearward from the corresponding lower ends of both the down frames 14. The body frame F can further include a pair of left and right center frames 16 extending downward from the corresponding rear ends of the main frames 13 and joined to the corresponding rear ends of both the lower frames 15. A pair of left and right seat rails 17 extend rearward upwardly from the corresponding rear ends of the main frames 13. Rear frames 18 connecting lower portions of the center frames 16 with the corresponding rear portions of the seat rails 17. The main frames 13, the down frame 14, the lower frames 15 and the center frames 16 can be formed integrally with one another by bending metal pipes.

A power unit P including, for example, a multi-cylinder, e.g., 2-cylinder engine E and a transmission M (see FIG. 3) partially incorporated in a crankcase 19 of the engine E is disposed in an area surrounded by the main frames 13, the down frames 14, the lower frames 15 and the center frames 16 so as to be supported by the body frame F. A swing arm 20 is supported at its front end by pivot plates 21 via a support shaft 22 in a vertically swingable manner. The swing arm 20 rotatably supports at its rear end a rear wheel WR driven by the power exerted by the power unit P. The pivot plates 21 are installed at the corresponding lower portions of the center frames 16. A fuel tank 24 can be mounted on the main frames 13 above the engine E. A riding front seat 25 disposed rearward of the fuel tank 24 and a riding rear seat 26 disposed further rearward of the riding front seat 25 are supported by the seat rails 17.

Figure 2:
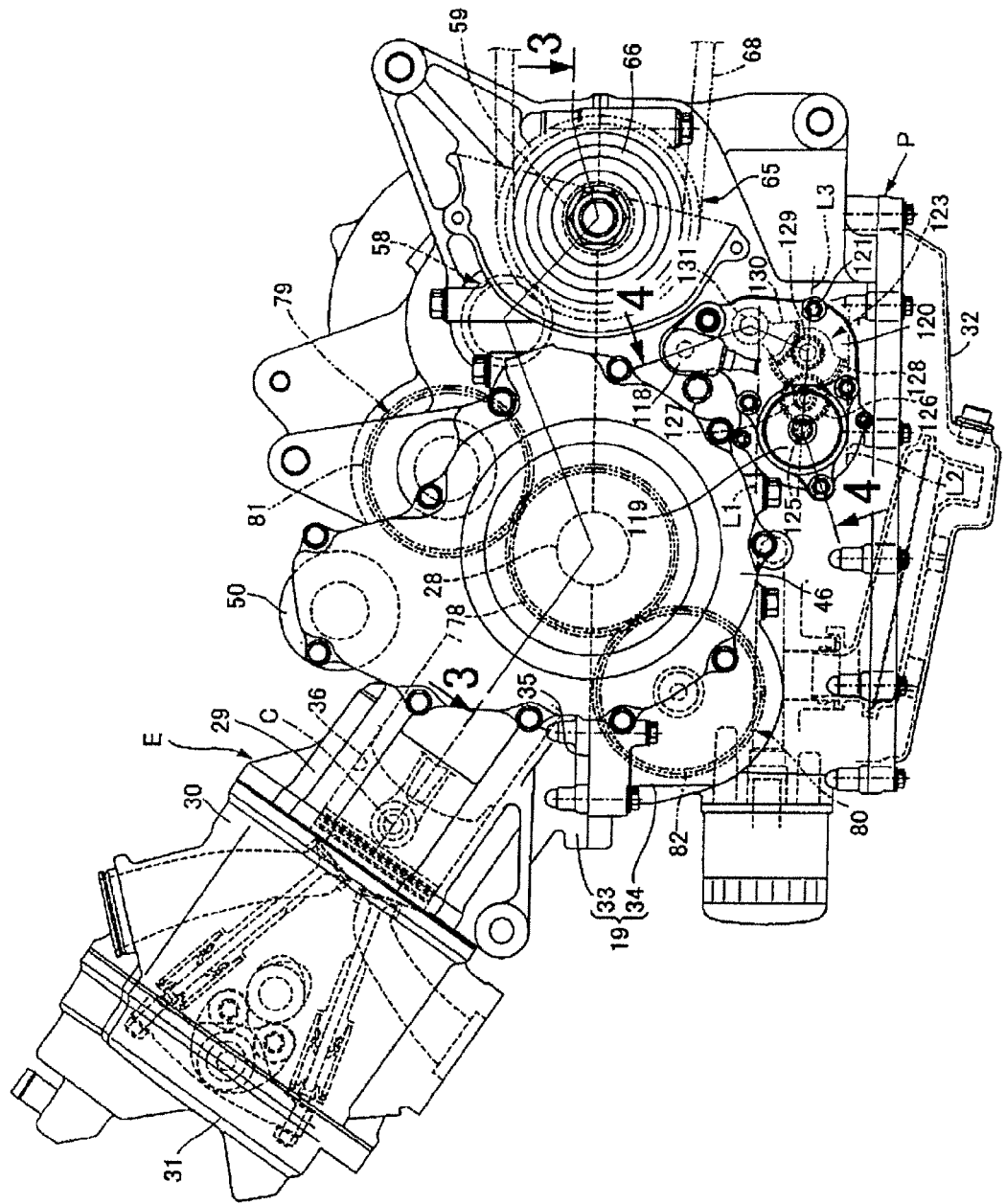
FIG. 2 is a lateral view of a power unit as viewed from the same direction as in FIG. 1.

With reference to FIG. 2, the engine E can include a crankcase 19, a cylinder block 29, a cylinder head 30 and a head cover 31. The crankcase 19 rotatably supports a crankshaft 28 having an axis extending in a vehicle-width direction. The cylinder block 29 can have a forwardly tilting cylinder axis C and is joined to the front upper end of the crankcase 19. The cylinder head 30 is joined to the upper end of the cylinder block 29. The cylinder head cover 31 is joined to the upper end of the cylinder head 30. An oil pan 32 is joined to the lower portion of the crankcase 19.

Figure 3:
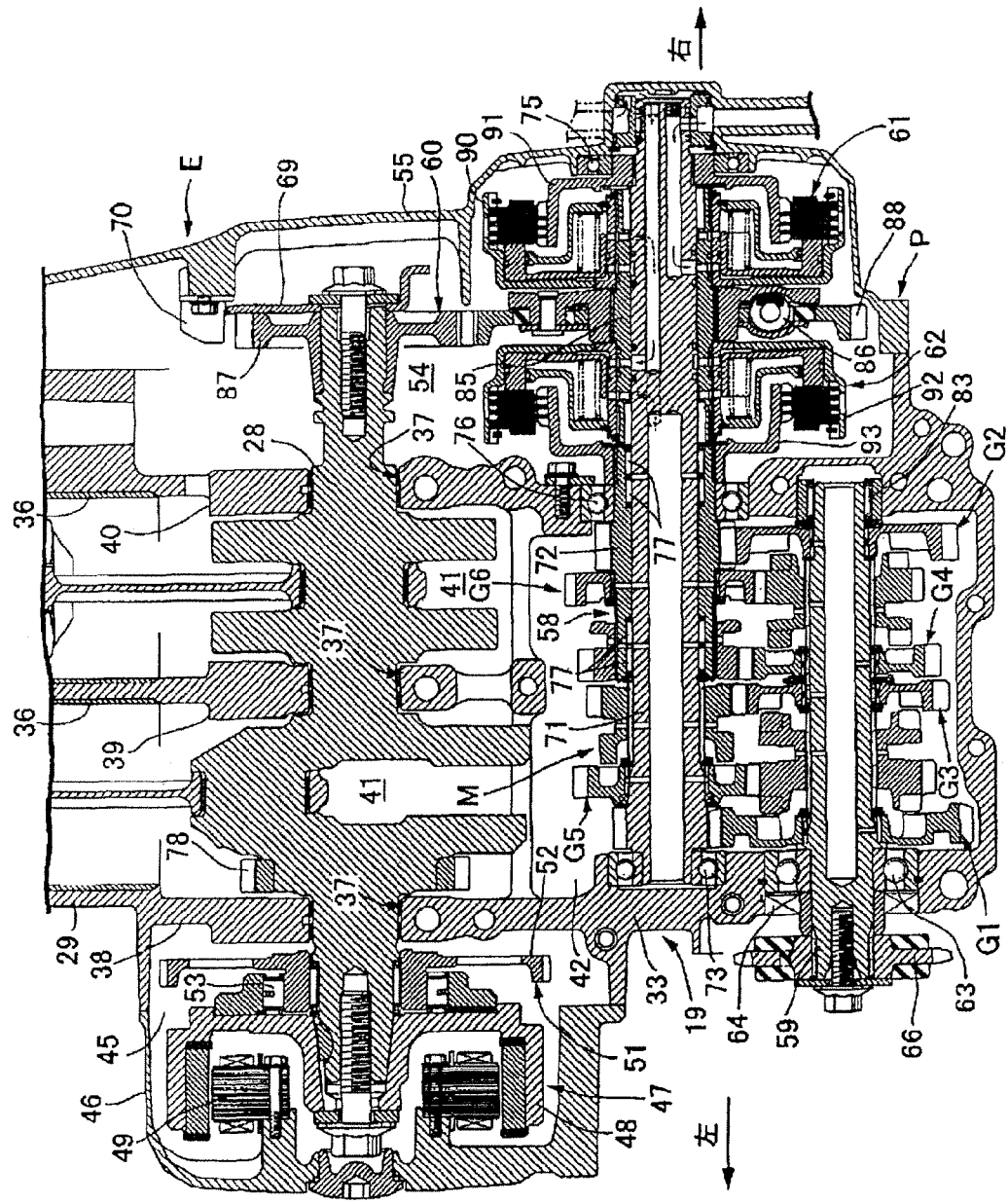
FIG. 3 is a cross-sectional view taken along line 3-3 in FIG. 2.

With additional reference to FIG. 3, the crankcase 19 is composed of an upper case half body 33 and a lower case half body 34 which can vertically be split at a split surface 35 extending along a horizontal plane passing the axis of the crankshaft 28. The cylinder block 29 is formed integrally with the upper case half body 33.

The cylinder block 29 can have a plurality of, e.g. two cylinder bores 36, 36 juxtaposed with each other in the vehicle-width direction. The crankcase 19 rotatably supports the crankshaft 28 extending in the alignment direction of the cylinder bores 36, i.e., in the vehicle-width direction. The crankcase 19 is provided with first, second and third support walls 38, 39, 40 having respective bearing holes 37. The bearing holes 37 are adapted to receive the crankshaft 28 passed therethrough and rotatably support it. The first, second and third support walls 38, 39, 40 can be provided to be rowed in order from one end (the left end in FIG. 3) of the crankshaft 28 in the axial direction toward the other end (the right end in FIG. 3). Additionally, in the crankcase 19, crank chambers 41, 41 are formed between the corresponding support walls in the direction along the axis of the crankshaft 28, i.e., between the first and second support walls 38, 39 and between the second and third walls 39, 40 so as to correspond to a plurality of the respective cylinder bores 36. A transmission chamber 42 is formed in the internal rear portion of the crankcase 19 so as to communicate with each of the crank chambers 41.

A generator cover 46 is joined to the left lateral surface of the crankcase 19 to define a generator chamber 45 between the crankcase 19 and the generator cover 46. A rotor 48 of a generator 47 housed in the generator chamber 45 is secured to an end portion of the crankshaft 28 entering the generator chamber 45. A stator 49 of the generator 47 is secured to the generator cover 46 so as to surround the rotor 48.

As illustrated in FIG. 2, a starter motor 50 is fixedly disposed on the upper portion of the crankcase 19 so as to be covered from the side by the upper end portion of the left case cover 46. A driven gear 52 is connected to the rotor 48 via a one-way clutch 53. This driven gear 52 constitutes part of a speed reduction gear train 51 adapted to transmit power from the starter motor 50.

A drive gear 78 close inwardly to the first support wall 38 of the crankcase 19 is secured to the crankshaft 28. As illustrated in FIG. 2, first and second balancers 79, 80 as primary balancers are rotatably supported by the crankcase 19 so that the first balancer 79 is disposed rearward of and obliquely above the crankshaft 28 and the second balancer 80 is disposed forward of and obliquely below the crankshaft 28. Driven gears 81 and 82 provided on the first and second balancers 79 and 80, respectively, are meshed with the drive gear 78.

A right case cover 55 is joined to the right lateral surface of the crankcase 19 to define a clutch chamber 54 between the crankcase 19 and the right case cover 55. In this way, the transmission M is housed in the transmission chamber 42. The transmission M is composed of a plurality of gear trains for respective speed steps, e.g., first- through sixth-speed gear trains G1-G6 capable of being selectively established between a main shaft 58 and a counter shaft 59. The main shaft 58 and the counter shaft 59 are rotatably supported by the crankcase 19 so as to have respective axes parallel to the crankshaft 28. In addition, a primary speed reduction device 60 transmitting the power from the crankshaft 28 and first and second hydraulic clutches 61, 62 interposed between the primary speed reduction device 60 and the main shaft 58 are housed in the clutch chamber 54.

The axis of the counter shaft 59 is disposed on the split surface 35 between the upper half case half body 33 and lower case half body 34 of the crankcase 19. The counter shaft 59 has one end rotatably supported by the right sidewall of the crankcase via a roller bearing 83 and the other end projecting from the left lateral portion of the rear portion of the crankcase 19 with a ball bearing 63 and an annular seal member 64 interposed between the crankcase 19 and the counter shaft 59.

The rotational power outputted from the other end of the counter shaft 59 is transmitted to the rear wheel WR via power transmitting means 65 as illustrated in FIG. 1. The power transmitting means 65 is configured such that an endless chain 68 is wound around a drive sprocket 66 secured to a shaft end of the counter shaft 59 and around a driven sprocket 67 installed coaxially with the rear wheel WR.

A pulser 69 is secured to the end of the crankshaft 28 in the clutch chamber 54. A rotation speed sensor 70 disposed in the clutch chamber 54 is secured to the right case cover 66 so as to face the outer circumference of the pulser 69.

The main shaft 58 is composed of a first shaft 71 and a second shaft 72 adapted to receive the first shaft 71 passed therethrough coaxially and relatively rotatably. The first gear train G1, the third gear train G3 and the fifth gear train G5 are installed between the first shaft 71 and the counter shaft 59. The second gear train G2, the fourth gear train G4 and the sixth gear train G6 are installed between the second shaft 72 and the counter shaft 59.

The first shaft 71 is formed to have a smaller diameter than the second shaft 72. One end portion of the first shaft 71 rotatably passing through the crankcase 19 is rotatably supported by the right case cover 55 via a first clutch inner 91 and a ball bearing 75. The other end of the first shaft 71 is rotatably supported by the upper half body 33 of the crankcase 19 via a ball bearing 73. An axially intermediate portion of the second shaft 72, larger in diameter than the first shaft 71, is rotatably supported by the crankcase 19 via a ball bearing 76. An intermediate portion of the first shaft 71 is passed through the second shaft 72 coaxially and relatively rotatably. A plurality of needle bearings 77, 77 are interposed between the first shaft 71 and the second shaft 72.

A transmission tubular shaft 85 axially adjacent to the second shaft 72 is worn on a near-one-end intermediate portion of the first shaft 71 relatively rotatably with its axial position fixed. The first hydraulic clutch 61 is installed on the first shaft 71 so as to be capable of switching the connection and disconnection of power between the transmission tubular shaft 85 and the first shaft 71. The second hydraulic clutch 62 is installed on the first shaft 71 so as to be capable of switch the connection and disconnection of power between the transmission tubular shaft 85 and the second shaft 72.

The power from the crankshaft 28 is transmitted to the transmission tubular shaft 85 via the primary speed reduction device 60 and the damper spring 86. The primary speed reduction device 60 is composed of a drive gear 87 rotated together with the crankshaft 28 and a driven gear 88 disposed coaxially with the first and second shafts 71, 72 to be meshed with the drive gear 87. The driven gear 88 is connected to the transmission tubular shaft 85 via the damper spring 86.

The first hydraulic clutch 61 is disposed on the axial one side of the first shaft 71 with respect to the primary speed reduction device 60. The first hydraulic clutch 61 includes a first clutch outer 90 joined to the transmission tubular shaft 85 so as to be incapable of relative rotation and a first clutch inner 91 joined to the first shaft 71 so as to be incapable of relative rotation with a ball bearing 75 interposed between the right case cover 55 and the first clutch inner 91 and is configured as a multiple-disk type. During the application of hydraulic pressure, the first hydraulic clutch 61 is brought into a clutch-on state where the rotational power transmitted from the crankshaft 28 to the first clutch outer 90 via the primary speed reduction device 60, the damper spring 86 and the transmission tubular shaft 85.

The second hydraulic clutch 62 is disposed closer to the crankcase 19 than the first hydraulic clutch 61 so as to put the primary speed reduction device 60 between the first hydraulic clutch 61 and the second hydraulic clutch 62. The second hydraulic clutch 62 includes a second clutch outer 92 joined to the transmission tubular shaft 85 so as to be incapable of relative rotation and a second clutch inner 93 joined to the second shaft 72 so as to be incapable of relative rotation and is configured as a multiple-disk type. During the application of hydraulic pressure, the second hydraulic clutch 62 is brought into a clutch-on state where the rotational power transmitted from the crankshaft 28 to the second shaft 72 via the primary speed reduction device 60, the damper spring 86 and the transmission tubular shaft 85.

Figure 4:
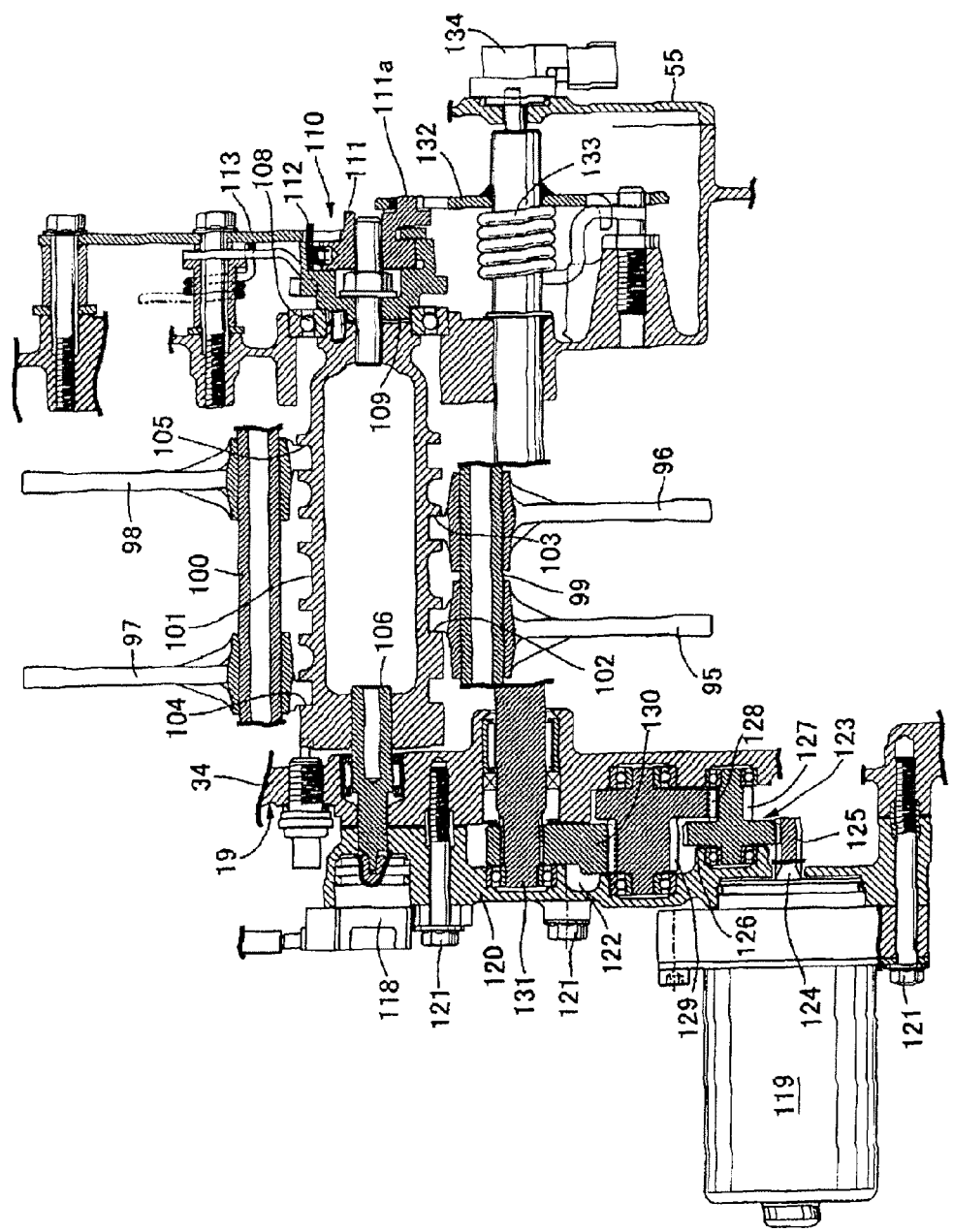
FIG. 4 is a cross-sectional view taken along line 4-4 in FIG. 2.

With additional reference to FIG. 4, to selectively establish the first- through sixth-speed gear trains G1-G6 in the transmission M, first and second shift forks 95, 96 are axially slidably supported by a first shift fork shaft 99 and third and fourth shift forks 97, 98 are axially slidably supported by a second shift fork shaft 100. The first shift fork shaft 99 has an axis parallel to the main shaft 58 and to the counter shaft 59 and is supported by the lower case half body 34 of the crankcase 19. The second shift fork shaft 100 has an axis parallel to the first shift fork 99 and is supported by the lower case half body 34 of the crankcase 19.

A shift drum 101 having an axis parallel to the first and second shift fork shafts 99, 100 is turnably supported by the lower case half body 34 of the crankcase 19. The first through fourth shift forks 95, 96, 97 and 98 are engaged with four engaging grooves 102, 103, 104 and 105, respectively, provided on the outer surface of the shift drum 101. The engaging grooves 102 to 105 are formed to determine the respective positions of the first through fourth shift forks 95 to 98 on the first and second shift fork shafts 99, 100 in accordance with the turned position of the shift drum 101. The turning of the shift drum 101 selectively establishes the first- through sixth-speed gear trains G1-G6 in accordance with the turned position.

A shaft 106 coaxially secured to one end portion of the shift drum 101 is rotatably supported via a roller bearing 107 by the left sidewall of the lower half body 34 of the crankcase 19. In addition, one end portion of the shaft 106 projects laterally from the left sidewall of the lower case half body 34. A shift drum center 109 is coaxially secured to the other end of the shift drum 101. The shift drum center 109 and the other end portion of the shift drum 101 are turnably supported via a ball bearing 108 by the right sidewall of the lower case half body 34 of the crankcase 19.

The shift drum 101 is drivingly turned stepwise by the actuation of shift position changing drive means 110 which is coaxially connected to the other end portion of the shift drum 101 so as to be operated by receiving a drive force. The shift position changing drive assembly 110, which can function as a shift position changing drive means, 110 has been known in the art and includes a drum shifter 111, poles 112 and a fixed guide plate 113. The drum shifter 111 is partially disposed in the shift drum center 109 so as to be capable of turning around its axis coaxial with the shift drum 101. The poles 112 are symmetrically attached to the drum shifter 111 so as to rise and fall in the radial direction of the drum shifter 111 and are raised and biased in a direction of being engaged with the inner circumference of the drum shifter 111 at a plurality of circumferential positions. The guide plate 113 guides the rising and falling state of the polls 112 in response to the turning of the drum shifter 111.

A shift position sensor 118 is connected to one end portion of the shift drum 101 so as to be coaxially continuous with the shaft 106. The shift position sensor 118 detects which one of the first- through sixth-speed gear trains G1-G6 is established by detecting the turning angle of the shift drum 101. Both a shift actuator 119 exerting power for driving the shift position changing drive assembly 110 and the shift position sensor 118 are mounted to the cover member 120. The cover member 120 is attached by means of a plurality of bolts 121 to the left sidewall of the lower case half body 34 of the crankcase 19 so as to be disposed rearward of and below the generator case 46. Additionally, the shift actuator 119 is an electric motor having a rotational axis parallel to the axis of the shift drum 101. The shift actuator 119 and the shift position sensor 118 are mounted to the external surface, facing the same side, of the cover member 120.

A speed reduction chamber 122 is formed between the cover member 120 and the crankcase 19. A speed reduction mechanism 123 adapted to reduce the power outputted from the shift actuator 119 is housed in the speed reduction chamber 122.

The speed reduction mechanism 123 can include a drive gear 125 provided on an output shaft 124 of the shift actuator 119. A first idle gear 126 meshes with the drive gear 125, and a second idle gear 127 rotates together with the first idle gear 126. A third idle gear 128 meshes with the second idle gear 127, and a fourth idle gear 129 rotating together with the third idle gear 128; and a driven gear 130 meshes with the fourth idle gear 129. The first and second idle gears 126, 127 can be formed integrally with each other and are rotatably supported by the cover member 120 and the crankcase 19. The third and fourth idle gears 128, 129 are formed integrally with each other and are rotatably supported by the cover member 120 and the crankcase 19. The third idle gear 128 and the driven gear 130 are, in this example, sector gears.

One end portion of a shift spindle 131 is connected to the driven gear 130 of the speed reduction mechanism 123 so as to be incapable of relative rotation. The shift spindle 131 is turnably supported by the lower case half body 34 of the crankcase 19. The other end portion of the shift spindle 131 is interlocked with and connected to the shift position changing drive assembly 110. An arm 132 secured to the other end portion of the shift spindle 131 is connected to a pin 111a. This pin 111a is provided to project from a position offset from a turning axis of the drum shifter 111 of the shift position changing drive means 110. A lost motion spring 133 is installed between the other end of the shift spindle 131 and the crankcase 19.

Additionally, a shift spindle angle sensor 134 for detecting the turn angle of the shift spindle 131 can be connected to the other end portion of the shift spindle 131 and supported by the right case cover 55.

Focusing on FIG. 2, the shift position sensor 118 is disposed between the crankshaft 28 and the counter shaft 59 as viewed from the side. The shift position sensor 118 and the shift actuator 119 are disposed along the outer circumference of the drive gear 78 installed on the crankshaft 28. The shift position sensor 118 is disposed below a plane, i.e. the split surface 35, passing through the central axis of the crankshaft 28 and of the counter shaft 59. The shift actuator 119 is disposed below the shift position sensor 118. In addition, as illustrated in FIG. 4, the shift actuator 119 is mounted to the cover member 120 so as to project more externally laterally than the shift position sensor 118.

The meshing portions of the plurality of gears 125 to 130 constituting the speed reduction mechanism 123 are disposed between a pair of upper and lower imaginary horizontal lines L1, L2 (see FIG. 2) passing through the upper end and lower end, respectively, of the shift actuator 119 as viewed from the side. This is an eighth characteristic.

Further, a straight line L3 is set roughly parallel to the split surface 35 between the upper and lower case half bodies 33, 34 of the crankcase 19. This straight line L3 passes through the respective rotational centers of the gears 125 to 129, excluding the final driven gear 130, of the plurality of gears 125 to 130 constituting the speed reduction mechanism 123, and through the central axis of the shift actuator 119 which is an electric motor.

A description is next given of the function of an embodiment of the present invention. The shift actuator 119 exerting the power driving the shift position changing drive assembly or means 110 and the shift position sensor 118 are mounted to the cover member 120 attached to and covering the crankcase 19. Therefore, while allowing for automatic gear shifting by use of the shift actuator 119, the number of component parts can be reduced and assembly performance can be enhanced compared with the case where the shift actuator 119 and the shift position sensor 118 are mounted to respective separate members.

The speed reduction mechanism 123 reducing the power outputted from the shift actuator 119 is housed in the speed reduction chamber 122 defined between the cover member 120 and the crankcase 19. Therefore, the cover member 120 protecting the speed reduction mechanism 123 can be used to mount the shift actuator 119 and the shift position sensor 118 thereto. This can contribute to a reduction in the number of component parts.

The shift actuator 119 can be an electric motor and the shift actuator 119 and the shift position sensor 118 are mounted to the external surface, facing the same side, of the cover member 120. Therefore, it is possible to enhance the maintenance for the shift actuator 119 and the shift position sensor 118 which are electric components.

The shift spindle 131 connected at one end to the driven gear 130 of the speed reduction mechanism 123 and turnably supported by the crankcase 19 is interlocked with and connected to the shift position changing drive assembly 110 at the other end. Therefore, the speed reduction mechanism 123 and the shift position changing drive assembly 110 can be arranged to avoid the mutual interference thereof and disposed in the crankcase 19 compactly.

The shift position sensor 118 is disposed between the crankshaft 28 and the counter shaft 59 as viewed from the side and the shift position sensor 118 and the shift actuator 119 are disposed along the outer circumference of the drive gear 78 installed on the crankshaft 28. Therefore, the vertical width of a space required by the cover member 120 to arrange the shift position sensor 118 and the shift actuator 119 can be reduced compared with the case where the shift position sensor 118 and the shift actuator 119 are disposed to align with each other in the vertical direction. This can contribute to the downsizing of the engine E.

The shift position sensor 118 is disposed below the plane passing through the respective central axes of the crankshaft 28 and the counter shaft 59. In addition, the shift actuator 119 is mounted to the cover member 120 so as to be located below the shift position sensor 118 and project more externally laterally than the shift position sensor 118. Thus, the foot rest space of the motorcycle can be enlarged.

The shift spindle angle sensor 134 for detecting the turning angle of the shift spindle 31 is connected to the other end of the shift spindle 31. Therefore, the shift position sensor 118 and the shift spindle angle sensor 134 are disposed on the sides opposite to each other in the axial direction of the shift spindle so as to avoid the mutual interference. In addition, the shift spindle 131 and the shift drum 101 can be arranged close to each other.

The speed reduction mechanism 123 is composed of the plurality of gears 125 to 130 and the meshing portion of the gears 125 to 130 is disposed between the pair of upper and lower imaginary horizontal lines L1, L2 passing through the upper end and lower end, respectively, of the shift actuator 119. Thus, the speed reduction mechanism 123 can be configured in a vertically compact manner.

The straight line L3 passing through the respective rotational centers of the gears 125 to 129, excluding the final driven gear 130, of the plurality of gears 125 to 130 constituting the speed reduction mechanism 123, and through the central axis of the shift actuator 119 as an electric motor is set roughly parallel to the split surface 35 between the upper and lower case half bodies 33, 34 constituting the crankcase 19. Therefore, the shift actuator 119 and the speed reduction mechanism 13 can be configured compactly so as not to be enlarged vertically.

The embodiment of the present invention has been described thus far. However, the invention is not limited to the embodiment described above. The embodiment can be modified in design in various ways not departing from the invention recited in claims.

DESCRIPTION OF REFERENCE SYMBOLS

19 . . . Crankcase
28 . . . Crankshaft
33, 34 . . . Case half body
35 . . . Split surface
58 . . . Main shaft
59 . . . Counter shaft
78 . . . Drive gear
101 . . . Shift drum
110 . . . Shift position changing drive assembly
118 . . . Shift position sensor
119 . . . Shift actuator
120 . . . Cover member
122 . . . Speed reduction chamber
123 . . . Speed reduction mechanism
131 . . . Shift spindle
134 . . . Shift spindle angle sensor
G1, G2, G3, G4, G5, G6 . . . Gear train

We claim:

1. A transmission system for a vehicle, said transmission system comprising:
a plurality of gear trains configured to provide respective speed steps housed in a crankcase, said plurality of gear trains being configured to be selectable,
a shift drum turnably supported by the crankcase, and configured to select one gear train of the plurality of gear trains in response to a turned position;
a shift position changing drive assembly coaxially connected to the shift drum and configured to be operated by receiving a drive force, the shift position changing drive assembly configured to drivingly turn the shift drum in response to the operation;
a shift position sensor configured to detect which one of the gear trains is being selected;
a shift actuator configured to exert power driving the shift position changing drive assembly;
a crankshaft having an axis extending in a vehicle-width direction; and
an oil pan joined to the lower portion of the crankcase,
wherein the shift actuator and the shift position sensor are mounted to a cover member mounted to the crankcase to cover the crankcase, wherein the shift position sensor is disposed below a plane passing through respective central axes of the crankshaft and a counter shaft, and the shift actuator is disposed below the shift position sensor, and
wherein the plurality of gear trains are disposed between a main shaft and the counter shaft which are rotatably supported by the crankcase so as to have respective axes parallel to the crankshaft rotatably supported by the crankcase, and the shift position sensor disposed between the crankshaft and the counter shaft as viewed from the side and the shift actuator are disposed along an outer circumference of a drive gear disposed on the crankshaft.

2. The transmission system according to claim 1, further comprising a speed reduction mechanism configured to reduce the power outputted from the shift actuator, said speed reduction mechanism being housed in a speed reduction chamber defined between the cover member and the crankcase.

3. The transmission system according to claim 1, wherein the shift actuator comprises an electric motor, and wherein the shift actuator and the shift position sensor are mounted to an external surface, facing a same side, of the cover member.

4. The transmission system according to claim 2, wherein a shift spindle is connected at one end portion to the speed reduction mechanism and is turnably supported by the crankcase, said shift spindle being interlocked with and connected to the shift position changing drive assembly at another end thereof.

5. The transmission system according to claim 1,
wherein the shift actuator is mounted to the cover member so as to project more externally outwardly than the shift position sensor.

6. The transmission system according to claim 4, further comprising
a shift spindle angle sensor configured to detect a turning angle of the shift spindle, said shift spindle angle sensor being connected to the shift spindle.

7. The transmission system according to claim 2,
wherein the speed reduction mechanism comprises a plurality of gears and a meshing portion of at least one gear of the plurality of gears is disposed between a pair of upper and lower imaginary horizontal lines passing through an upper end and a lower end, respectively, of the shift actuator as viewed from the side.

8. The transmission system according to claim 7,
wherein the crankcase comprises of a pair of case half bodies configured to be split vertically, and wherein a straight line passing through respective rotational centers of individual gears, excluding a final driven gear, of the plurality of gears constituting the speed reduction mechanism, and through a central axis of the shift actuator as an electric motor is set roughly parallel to a split surface between upper and lower case half bodies.

9. A transmission system for a vehicle, said transmission system comprising:
crankcase means for containing and supporting transmission components therein;
gear train means disposed in said crankcase means, said gear train means for providing respective speed steps in a selectable manner;
shift drum means rotatably supported in said crankcase means, said shift drum means for selecting one of said respective speed steps provided by said gear train means;
shift position changing drive means coaxially connected to the shift drum means, said shift position changing drive means for receiving a drive force and drivingly turning the shift drum means in response to said drive force;
shift position sensor means for detecting which respective speed step is being selected;
shift actuator means for exerting power driving the shift position changing drive means, said shift actuator means and said shift position sensor means being mounted to a cover member disposed on the crankcase means for covering the crankcase means;
crankshaft means having an axis extending in a vehicle-width direction; and
oil pan means joined to the lower portion of the crankcase,
wherein the shift position sensor means is disposed below a plane passing through respective central axes of the crankshaft and a countershaft, and wherein the shift actuator means is disposed below the shift position sensor means, and
wherein the gear train means is disposed between a main shaft and the countershaft rotatably supported by the crankcase means so as to have respective axes parallel to the crankshaft rotatably supported by the crankcase means, and wherein the shift position sensor means is disposed between the crankshaft and the countershaft as viewed from a side and the shift actuator means is disposed along an outer circumference of a drive gear disposed on the crankshaft.

10. The transmission system according to claim 9, further comprising speed reduction means for reducing power outputted from the shift actuator means, said speed reduction means being housed in a speed reduction chamber defined between the cover member and the crankcase means.

11. A transmission system according to claim 9, wherein the shift actuator means comprises an electric motor, and wherein the shift actuator means and the shift position sensor means are disposed on an external surface of the cover member.

12. The transmission system according to claim 10, further comprising shift spindle means connected at one end portion to the speed reduction means, said shift spindle means being interlocked with and connected to the shift position changing drive means at another end thereof.

13. The transmission system according to claim 9, wherein the shift actuator means is mounted to the cover member so as to project more externally outwardly than the shift position sensor means.

14. The transmission system according to claim 12, further comprising shift spindle angle sensor means for detecting a turning angle of the shift spindle means, said shift spindle angle sensor means being connected to the shift spindle means.

15. The transmission system according to claim 10, wherein the speed reduction means includes a plurality of gears, and wherein a meshing portion of at least one gear of the plurality of gears is disposed between a pair of upper and lower imaginary horizontal lines passing through an upper end and a lower end, respectively, of the shift actuator means as viewed from the side.

16. The transmission system according to claim 15, wherein the crankcase means comprises a pair of case half bodies configured to be split vertically, and wherein a straight line passing through respective rotational centers of individual gears, excluding a final driven gear, of the plurality of gears constituting the speed reduction means, and through a central axis of the shift actuator as an electric motor is set roughly parallel to a split surface between upper and lower case half bodies.

* * * * *